US011409074B2

United States Patent
Fujiwara

(10) Patent No.: US 11,409,074 B2
(45) Date of Patent: Aug. 9, 2022

(54) ELECTRONIC APPARATUS AND CONTROL METHOD THEREOF

(71) Applicant: CANON KABUSHIKI KAISHA, Tokyo (JP)

(72) Inventor: Shogo Fujiwara, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 177 days.

(21) Appl. No.: 16/914,577

(22) Filed: Jun. 29, 2020

(65) Prior Publication Data
US 2021/0003817 A1    Jan. 7, 2021

(30) Foreign Application Priority Data
Jul. 3, 2019   (JP) .............................. JP2019-124753

(51) Int. Cl.
*G03B 13/36*   (2021.01)
*G02B 7/28*    (2021.01)
*G06F 3/01*    (2006.01)

(52) U.S. Cl.
CPC ............. *G02B 7/287* (2013.01); *G03B 13/36* (2013.01); *G06F 3/013* (2013.01)

(58) Field of Classification Search
CPC ................................. G02B 7/287; G03B 13/36
See application file for complete search history.

(56) References Cited

U.S. PATENT DOCUMENTS

2020/0233487 A1*   7/2020   Grzesiak ................. G06F 3/017

FOREIGN PATENT DOCUMENTS

JP          2009-251658 A        10/2009

* cited by examiner

*Primary Examiner* — Minh Q Phan
(74) *Attorney, Agent, or Firm* — Venable LLP

(57) ABSTRACT

An electronic apparatus comprises a sight position detection unit configured to detect region of a sight positon to a display unit which displays an object, and a control unit configured to perform control to, in a case where a state where the detected region of the sight position is not moving continues for a first time period, select an object corresponding to the region of the sight position, and in a case where a state where the detected region of the sight position is moving and a direction of movement of the region of the sight position and a direction of movement of an object satisfy a predetermined condition continues for a second time period, select the object.

12 Claims, 5 Drawing Sheets

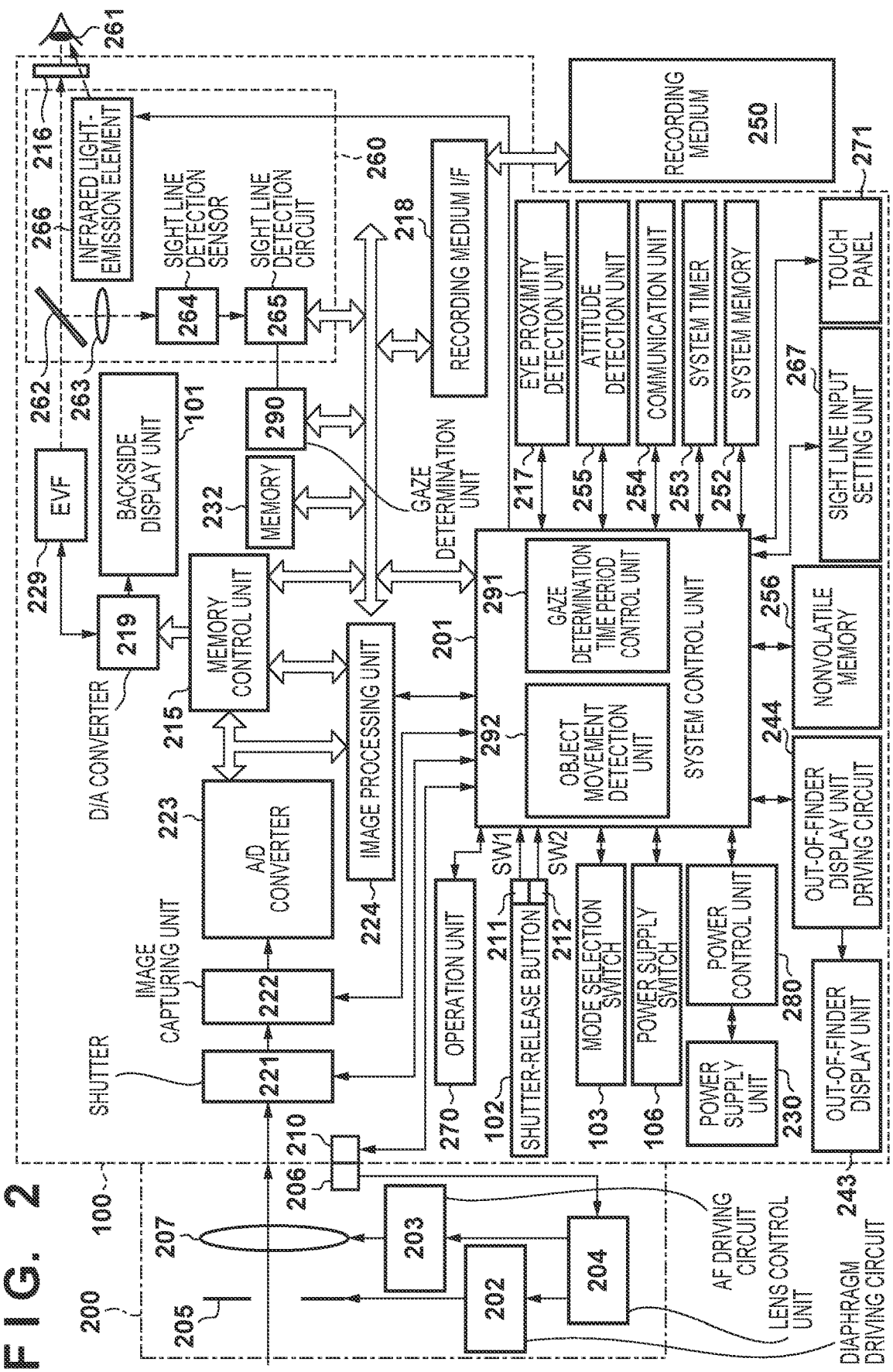

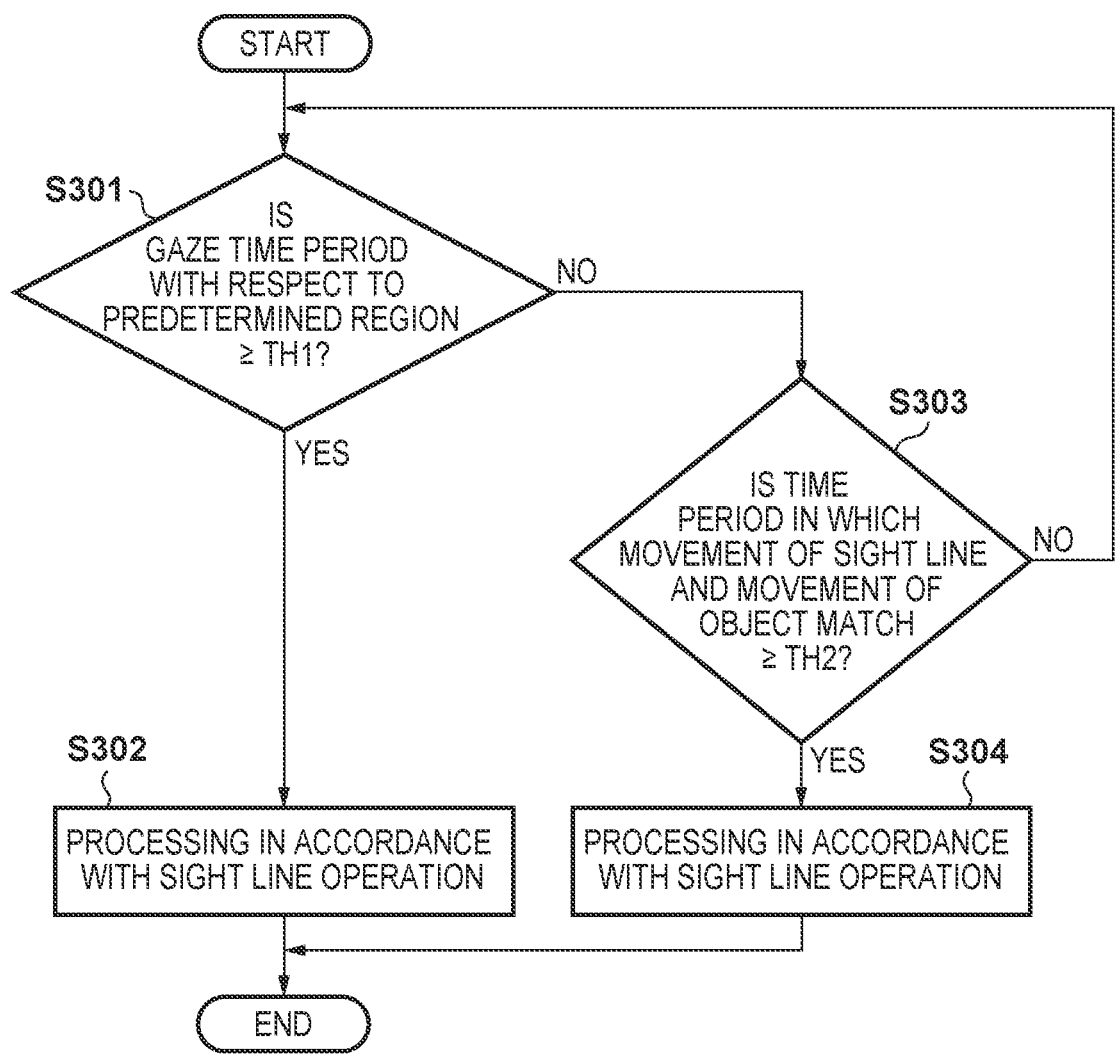

DETECT USER SIGHT-LINE POSITION
→ MEASURE SIGHT LINE DETECTION TIME PERIOD (GAZE TIME PERIOD)

IF USER SIGHT LINE IS FIXED FOR PREDETERMINED PERIOD OF TIME TH1
→ ONE-SHOT AF WITH RESPECT TO GAZE REGION

IF USER SIGHT LINE MOVED BEFORE PREDETERMINED PERIOD OF
TIME TH1 ELAPSES (IF MOVEMENT OF SIGHT LINE IS DETECTED)
→ TRANSITION TO STEP S303

FIG. 5A

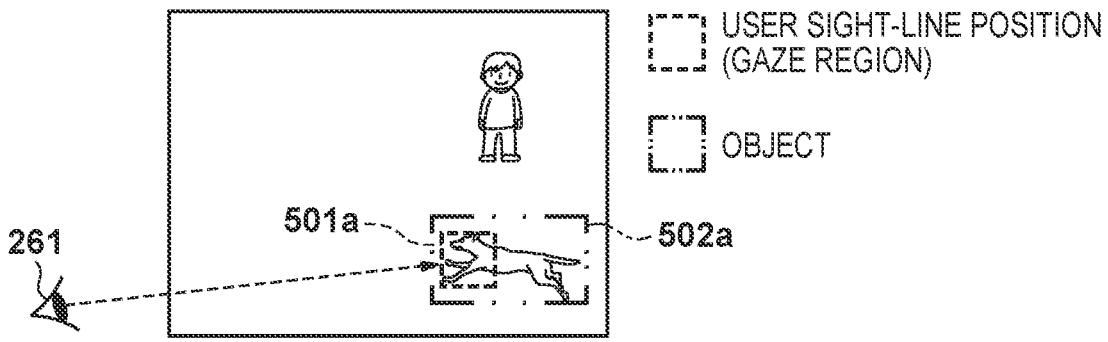

DETECT USER SIGHT-LINE POSITION → DETERMINE WHETHER MOVEMENT OF SIGHT LINE AND MOVEMENT OF OBJECT MATCH

FIG. 5B

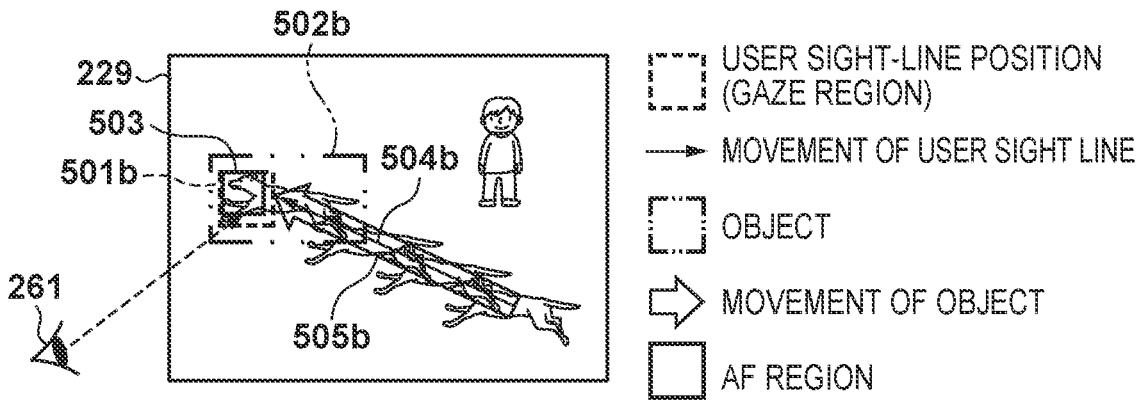

IF MOVEMENT OF USER SIGHT LINE AND MOVEMENT OF OBJECT MATCH FOR PREDETERMINED PERIOD OF TIME TH2 → TRACKING AF WITH RESPECT TO OBJECT

FIG. 5C

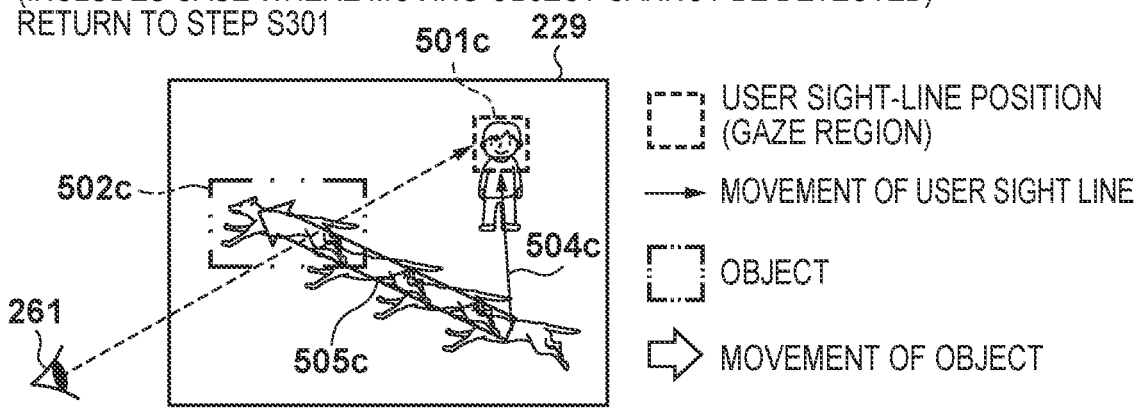

IF MOVEMENT OF USER SIGHT LINE AND MOVEMENT OF OBJECT DO NO MATCH (INCLUDES CASE WHERE MOVING OBJECT CANNOT BE DETECTED) → RETURN TO STEP S301

ELECTRONIC APPARATUS AND CONTROL METHOD THEREOF

BACKGROUND OF THE INVENTION

Field of the Invention

The present invention relates to an operation control technique in accordance with sight line input.

Description of the Related Art

There is a method of detecting a sight line of a user, and accepting an input in accordance with the sight line. Japanese Patent Laid-Open No. 2009-251658 discloses determining selection of a menu item in accordance with a sight-line position being fixed for a predetermined period of time on one menu item.

For example, in a case of selecting a subject for focus with a digital camera or the like, in the method of Japanese Patent Laid-Open No. 2009-251658, it is possible that a sight line will not keep up with movement of the subject, and it will cease to be possible to select the subject.

SUMMARY OF THE INVENTION

The present invention has been made in consideration of the aforementioned problems, and realizes techniques for enabling appropriate sight line input with respect to a moving body.

In order to solve the aforementioned problems, the present invention provides an electronic apparatus comprising: a sight position detection unit configured to detect region of a sight position to a display unit which displays an object; and a control unit configured to perform control to, in a case where a state where the detected region of the sight position is not moving continues for a first time period, select an object corresponding to the region of the sight position, and in a case where a state where the detected region of the sight position is moving and a direction of movement of the region of the sight position and a direction of movement of an object satisfy a predetermined condition continues for a second time period, select the object.

In order to solve the aforementioned problems, the present invention provides a method of controlling an electronic apparatus comprising: detecting region of a sight position to a display unit which displays an object; and performing control to, in a case where a state where the detected region of the sight position is not moving continues for a first time period, select an object corresponding to the region of the sight position, and in a case where a state where the detected region of the sight position is moving and a direction of movement of the region of the sight position and a direction of movement of an object satisfy a predetermined condition continues for a second time period, select the object.

In order to solve the aforementioned problems, the present invention provides a non-transitory computer-readable storage medium storing a program for causing a computer to execute a method of controlling an electronic apparatus comprising: detecting region of a sight position to a display unit which displays an object; and performing control to, in a case where a state where the detected region of the sight position is not moving continues for a first time period, select an object corresponding to the region of the sight position, and in a case where a state where the detected region of the sight position is moving and a direction of movement of the region of the sight position and a direction of movement of an object satisfy a predetermined condition continues for a second time period, select the object.

Further features of the present invention will become apparent from the following description of exemplary embodiments (with reference to the attached drawings).

BRIEF DESCRIPTION OF THE DRAWINGS

FIG. 2 is a block diagram showing an apparatus configuration of the present embodiment.

FIG. 3 is a flowchart illustrating sight line input processing of the preset embodiment.

FIGS. 5A to 5C illustrate sight line operation determination processing of steps S303 and S304 of FIG. 3.

DESCRIPTION OF THE EMBODIMENTS

Figure 1A:
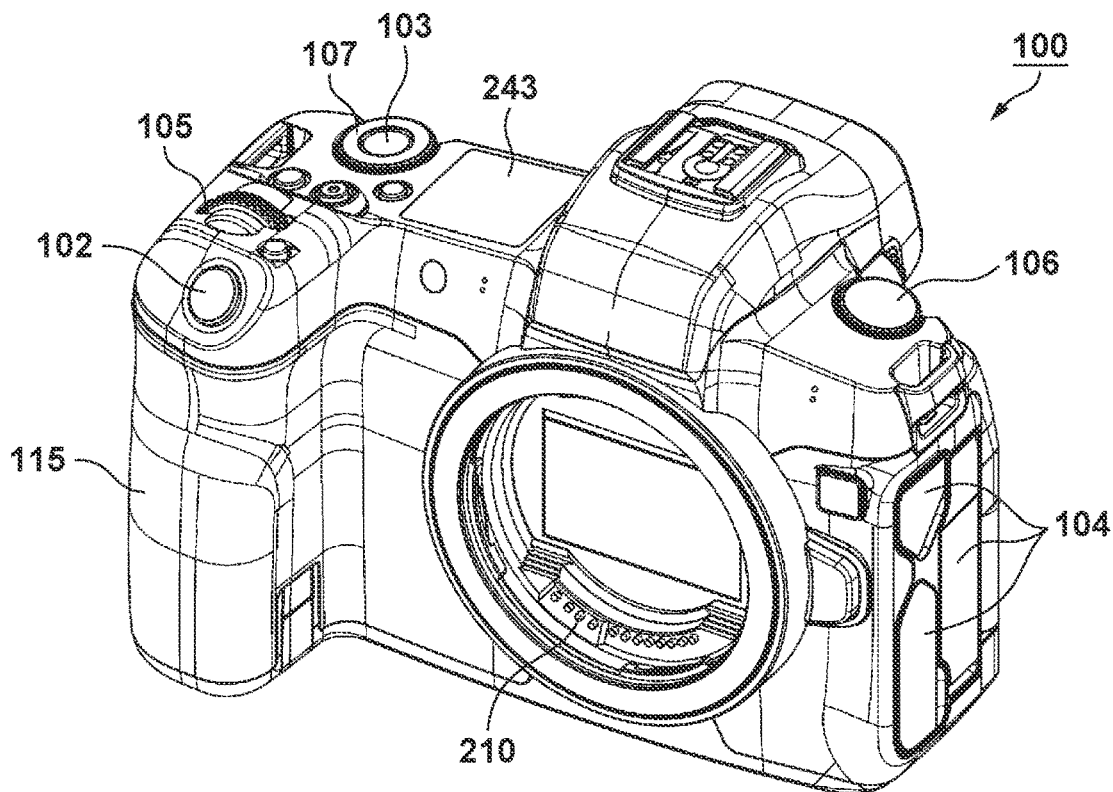
FIG. 1A is a front perspective view of an apparatus of a present embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

Hereinafter, embodiments in which an electronic apparatus of the present invention is applied to a digital camera which is an image capturing apparatus capable of shooting a still image and/or a moving image will be described in detail with reference to the accompanying drawings.

<Apparatus Configuration>

The configuration and functions of digital camera 100 according to the present embodiment will be described below with reference to FIGS. 1A, 1B and 2.

Figure 1B:
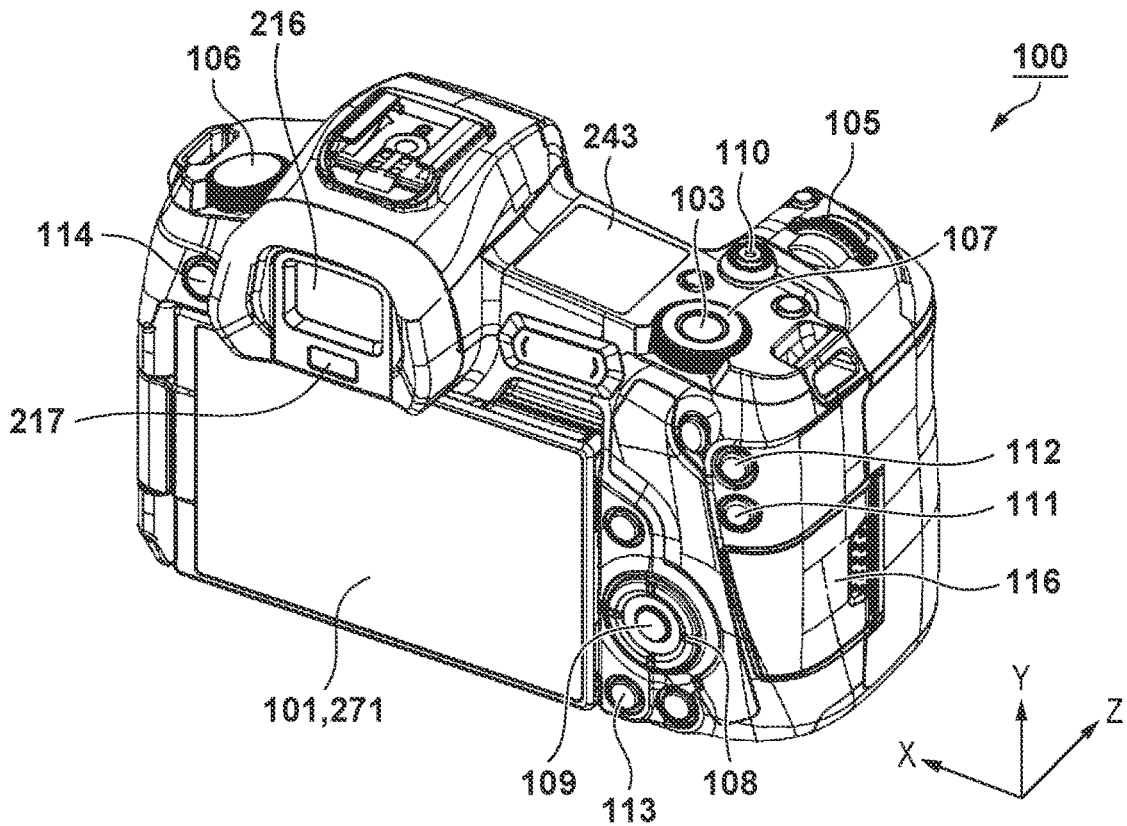
FIG. 1B is a back perspective view of the apparatus of the present embodiment.

FIG. 1A is a front perspective view of the digital camera 100, and FIG. 1B is a back perspective view of the digital camera 100.

In FIGS. 1A and 1B, a backside display unit 101 is a display device, such as a liquid crystal panel or an organic EL panel, provided on the back surface of the camera body, for displaying images and various types of information so that a user can visually recognize them. Moreover, the backside display unit 101 has a function of reproducing a still image after the still image was shot, a function of displaying a moving image that is being recorded, and a live view display function as well. An out-of-finder display unit 243 is a display device such as a liquid crystal panel or an organic EL panel provided on the upper surface of the camera body, and displays various setting values of the camera such as a shutter speed and a diaphragm aperture.

A shutter-release button 102 is a push button type operation member for giving a shooting instruction. A mode selection switch 103 is a dial type operation member for switching between various modes. The mode selection switch 103 switches the operation mode of a system control unit 201 to any of a still image shooting mode, a moving image recording mode, and a reproduction mode. The still image shooting mode includes an automatic shooting mode, an automatic scene determination mode, a manual mode, aperture-priority AE mode (Av mode), shutter speed priority mode (Tv mode), program AE mode (P mode), for example. The still image shooting mode also includes, for example, various scene mode each of which shooting scene-specific shooting setting is made, custom mode, and the like.

Using the mode selection switch 103, the mode is directly switched to any of the plurality of modes included in the still image shooting mode. Alternatively, it is also possible to switch, using the mode selection switch 103, to the still image shooting mode and then to switch, using another operation member, to any of the plurality of modes included in the still image shooting mode. Similarly, also the moving image recording mode and the reproduction mode may include a plurality of modes.

A terminal cover 104 is a cover member for protecting a connector (not illustrated) for connecting an external device and the digital camera 100 via a cable such as a USB cable. A main electronic dial 105 is a rotating operation member included in operation units 270 that will be described later with reference to FIG. 2, and by rotating this main electronic dial 105, setting values such as a shutter speed and a diaphragm aperture can be changed.

A power supply switch 106 is an operation member for the switching on/off of the power supply to the digital camera 100. A sub electronic dial 107 is a rotating operation member that can move a selected frame, scroll images, and the like. A cross key 108 is a movement instruction member that can perform, by one of four-directional buttons constituted by UP, DOWN, LEFT and RIGHT being pressed down, an operation that corresponds to the pressed portion of the cross key 108. A SET button 109 is a push button type operation member that is mainly used for determining a selection item. A video recording button 110 is a push button type operation member that is used for switching on/off of the live view display in the still image shooting mode and for starting or stopping the moving image shooting (recording) in the moving image recording mode. An enlargement button 111 is a push button type operation member that is used for turning on/off of the enlargement display during the live view and for changing the enlargement ratio during the enlargement display. Further, the enlargement button 111 is used for enlarging a reproduced image in a reproduction mode and increasing a magnification ratio. By operating the main electronic dial 105 after turning on of the enlarged display, the live view image can be enlarged or reduced. In the reproduction mode, the reproduced image is enlarged, and the main electronic dial 105 functions as an enlargement button for increasing an enlargement ratio. The AE lock button 112 is a push button type operation member that can fix an exposure state by being pressed in a shooting standby state. The reproduction button 113 is a push-button type operation member that is used to switch between the shooting mode and the reproduction mode. By pressing the reproduction button 113 during the shooting mode, the operation mode is switched to the reproduction mode, and the latest image among the images recorded on the recording medium 250 can be displayed on the backside display unit 101. A menu button 114 is a push button type operation member for displaying a menu screen on which various settings can be made on the backside display unit 101 when pressed. The user can intuitively perform various settings using the menu screen displayed on the backside display unit 101, the cross key 108, and the SET button 109.

The display of the backside display unit 101 and an EVF 229 described later are controlled by the system control unit 201 in accordance with the various operation modes described above.

An eyepiece part 216 is a look-through type eyepiece finder. The user can visually recognize an image displayed on an electronic viewfinder (hereinafter, referred to as EVF) 229 in the camera body via the eyepiece part 216, and confirm the focus and composition of the object image taken in through the lens unit 200.

An eye proximity detection unit 217 is arranged near the eyepiece part 216, and can detect approach of any object to the eyepiece part 216. As the eye proximity detection unit 217, for example, an infrared proximity sensor is used.

A communication terminal 210 is an electric contact for the digital camera 100 to perform communication with a lens unit 200 (FIG. 2). A lid 116 is a member for opening or closing a slot for mounting/removing the recording medium 250 to/from the digital camera 100. A grip 115 has a shape that makes it easy to be grasped by a user's right hand when he or she holds the digital camera 100. The shutter button 102 and the main electronic dial 105 are arranged at positions where the grip portion 115 can be operated by the index finger of the right hand while holding the digital camera 100 by gripping the grip portion 115 with the little finger, the ring finger and the middle finger of the right hand. In the same state, the sub electronic dial 107 is arranged at a position operable with the thumb of the right hand.

Next, the internal configuration of the digital camera 100 and lens unit 200 according to the present embodiment will be described with reference to FIG. 2. In FIG. 2, configurations that are the same as in FIGS. 1A and 1B are denoted by the same reference signs.

In FIG. 2, the lens unit 200 is equipped with a shooting lens 207, and is detachable from the digital camera 100. The shooting lens 207 is usually constituted by a plurality of lenses, but is simplified here and is shown by one lens only. A communication terminal 206 is an electric contact for the lens unit 200 to perform communication with the digital camera 100. The communication terminal 210 is an electric contact for the digital camera 100 to perform communication with the lens unit 200. The lens unit 200 performs communication with the system control unit 201 via the communication terminal 206, and a built-in lens control unit 204 controls a diaphragm driving circuit 202 so as to drive a diaphragm aperture 205, and controls an AF driving circuit 203 so as to displace the position of the shooting lens 207, thereby bringing the object image in focus.

A focal plane shutter 221 can freely control the exposure time of the image capturing unit 222 in accordance with an instruction from the system control unit 201. The image capturing unit 222 is an image sensor constituted by an imaging element such as a CCD or a CMOS for converting the object image into electrical signals. A/D converter 223 converts analog signals of one pixel output from the image capturing unit 222 into digital signals of, for example, 10 bits.

An image processing unit 224 performs resizing processing, such as predetermined pixel interpolation and reduction, and color conversion processing, with respect to data from the A/D converter 223 or data from a memory control unit 215. Further, the image processing unit 224 performs predetermined calculation processing using the captured image data, and the system control unit 201 performs exposure control and focus control based on the calculation results. Thus, AF (Automatic Focus) processing, AE (Automatic Exposure) processing, and EF (flash pre-emission) processing of TTL (Through the Lens) type are performed. Furthermore, the image processing unit 224 performs predetermined calculation processing using the captured image data, and AWB (Automatic White Balance) processing of TTL type is performed on the basis of the calculation results.

A memory control unit 215 controls to exchange data between the A/D converter 223, the image processing unit 224, and the memory 232. The digital data from the A/D converter 223 is directly written into a memory 232 via both the image processing unit 224 and the memory control unit 215 or via the memory control unit 215. The memory 232 stores the image data obtained from the image capturing unit 222 and the A/D converter 223, and image display data to be displayed on the backside display unit 101 or the EVF 229. The memory 232 has a storage capacity that is sufficient for storing a predetermined number of still images as well as moving images and audio for a predetermined time period. The memory 232 also functions as a memory for image display (video memory).

A D/A converter 219 converts the image display data stored in the memory 232 into an analog signal and supplies the backside display unit 101 or the EVF 229 with the analog signal. The image display data that was written into the memory 232 is displayed by the backside display unit 101 or the EVF 229 via the D/A converter 219. The backside display unit 101 and the EVF 229 perform display to a display device in accordance with the analog signal from the D/A converter 219. In this manner, the digital signals stored in the memory 232 are converted into analog signals, and the analog signals are successively transmitted to the backside display unit 101 or the EVF 229 so as to be displayed thereon, making it possible to perform live view (LV) display (through image display).

Various setting values of the camera such as a shutter speed and a diaphragm aperture are displayed on the out-of-finder display unit 243 via an out-of-finder display unit driving circuit 244.

A nonvolatile memory 256 is, for example, an EEPROM, which is electrically erasable and recordable. In the nonvolatile memory 256, constants and programs, for example, for operating the system control unit 201 are stored. In this context, "programs" may refer to programs for executing various flowcharts that will be described later.

The system control unit 201 has a CPU (Central Processing Unit or a MPU (Micro Processing Unit) for overall controlling the entire digital camera 100, and realizes, by executing the programs stored in the nonvolatile memory 256, the procedures of the flowchart that will be described later. The system memory 252 is, for example, a RAM and used also as a work memory where constants and variables for operating the system control unit 201, and the programs read out from the nonvolatile memory 256 are expanded. The system control unit 201 controls the memory 232, the D/A converter 219, the backside display unit 101, the EVF 229, and the like, so as to perform display control. A system timer 253 is a time measurement unit for measuring time periods for various types of controls and the time of an integrated clock.

A first shutter switch 211 and a second shutter switch 212 input the following operation instructions to the system control unit 201.

While the shutter-release button 102 provided on the digital camera 100 is being operated, that is, pressed halfway (the shooting preparation instruction), the first shutter switch 211 is turned on and generates a first shutter switch signal SW1. Upon receiving the first shutter switch signal SW1, the system control unit 201 causes the image processing unit 224 to start the AF processing, the AE processing, the AWB processing, the EF processing and the like.

When the operation of the shutter-release button 102 is completed, that is, the shutter-release button 102 is pressed fully (the shooting instruction), the second shutter switch 212 is turned on and generates a second shutter switch signal SW2. Upon receiving the second shutter switch signal SW2, the system control unit 201 starts a series of shooting processing from reading out the signal from the image capturing unit 222 to writing of image data to the recording medium 250.

The operation units 270 comprise operation members such as various switches and buttons for accepting various operations from a user, and communicating them to the system control unit 201, and include at least the following operation members: the shutter-release button 102, the mode selection switch 103, the main electronic dial 105, the power supply switch 106, the sub electronic dial 107, the cross key 108, the SET button 109, the video recording button 110, the enlargement button 111, the AE lock button 112, the reproduction button 113, and the menu button 114. In addition, the operation units 270 also include operation members for performing the following operations: settings such as a shooting mode, a continuous shooting mode, set, macro, page-forwarding, flash, menu movement, white balance, shooting quality selection, exposure correction, date/time, shutter speed, the aperture value, and exposure; turning image display on and off; turning a quick review that automatically reproduces a shot image immediately after shooting on or off; and deleting a reproduced image. In addition, the operation unit 270 includes a recording mode switch for selecting between a compressed recording mode for recording an image capture signal compressed by JPEG, MPEG, or the like and a RAW recording mode for converting an image capture signal to a digital signal and recording it as is, and an AF mode switching switch. AF modes include a one-shot AF mode for fixing focus to a predetermined region in a half-press state of the shutter-release button 102, and a tracking (servo) AF mode for continuing to align the focus to a predetermined subject. In addition, it is possible to automatically switch these AF modes (AI focus AF).

A power control unit 280 is constituted by, for example, a battery detection circuit, a DC-DC converter, a switch circuit for changing over the block to be supplied with power, and detects whether a battery has been inserted or not, the type of the battery, and the residual capacity thereof. Further, the power control unit 280 controls the DC-DC converter in accordance with the detection results and an instruction of the system control unit 201, and supplies a necessary voltage for a necessary length of time to each of the units including the recording medium 250.

A power supply unit 230 comprises a primary battery such as an alkaline battery or a lithium battery, a secondary battery such as a NiCd battery, a NiMH battery, or a Li-ion battery, or an AC adaptor. A recording medium interface (I/F) 218 is for interfacing with the recording medium 250 such as a memory card or a hard disk drive. The recording medium 250 is a recording medium such as a memory card for recording shot images, and constituted by a semiconductor memory, a magnetic disk, or the like.

The communication unit 254 can communicably connect to an external apparatus by a wireless antenna or a cable, and transmits and receives a video signal, an audio signal, and the like. The communication unit 254 can also connect to a wireless LAN (Local Area Network) and the Internet. The communication unit 254 can transmit image data (including a live view image) captured by the image capturing unit 222 and an image file recorded on the recording medium 250 to an external device, and can receive image data or other various information from the external device. Note that the communication unit 254 is not limited to a wireless LAN, but may use a wireless communication module such as an infrared communication, Bluetooth®, Bluetooth® Low Energy or Wireless USB, or a wired connection method such as a USB cable, HDMI®, IEEE 1394, or the like.

An attitude detection unit 255 detects the attitude (orientation) of the digital camera 100 with respect to the gravity direction. In this case, based on the attitude detected by the attitude detection unit 255, it is possible to discriminate whether an image shot by the image capturing unit 222 has been shot by setting the digital camera 100 in the landscape or portrait direction. The system control unit 201 can add the orientation information corresponding to the attitude detected by the attitude detection unit 255 to the image file of the image captured by the image capturing unit 222, and rotate and record the captured image. An acceleration sensor, gyro sensor and the like may be used as an attitude detection unit 255. The attitude detection unit 255 can also detect the movement (pan, tilt, lift, rest, etc.) of the digital camera 100 by using the acceleration sensor or the gyro sensor.

Included among the operation units 270 is also a touch panel (touch screen) 271 that is capable of detecting a touch operation on the backside display unit 101. The touch panel 271 and the backside display unit 101 can be constructed as a single integrated unit. For example, the touch panel 271 is constructed in such a manner that the transmittance of light will not interfere with the display presented by the backside display unit 101, and it is attached to the uppermost layer of the display face of the backside display unit 101. In addition, input coordinates on the touch panel 271 and display coordinates on the backside display unit 101 are correlated. As a result, a GUI can be constructed that makes it possible for the user to directly manipulate the screen displayed on the backside display unit 101. The system control unit 201 is capable of detecting the following touch operations and conditions performed by contacting the touch panel 271.

Newly touching of the touch panel 271 by a finger or pen which has not been in contact with the touch panel 271, that is a start of the touch (referred to as "touch-down" below).

A state in which the touch panel 271 is in contact with a finger or pen (referred to as "touch-on" below).

Movement of a finger or pen while in contact with the touch panel 271 (referred to as "touch-move" below).

Lifting of a finger or pen that has been in contact with the touch panel 271, that is an end of the touch (referred to as "touch-up" below).

A state in which the touch panel 271 is not being touched at all (referred to as "touch-off" below).

When touch-down is detected, the touch-on state is also detected at the same time. Unless touch-up is detected after touch-down, touch-on usually continues to be detected. Touch-move is also detected in a state where touch-on is being detected. Even if touch-on is being detected, touch-move is not detected unless the touch position moves. After touch-up of all the fingers or a pen that have been in contact is detected, the touch-off state is entered.

These operations/conditions and position coordinates at which the touch panel 271 is being touched by the finger or pen are communicated to the system control unit 201 through an internal bus and, based upon the information thus communicated, the system control unit 201 determines what kind of operation (touch operation) was performed on the touch panel 271. As for "touch-move", the determination can be made also for every vertical component and horizontal component with regard to the direction of movement of the finger or pen, which is moved on the touch panel 271, based upon a change in the position coordinates. Further, it is assumed that it is determined that a slide operation (drag) has been performed if it detects a touch-move over a predetermined distance. An operation in which a finger is touched against the touch panel, swiftly moved a certain distance, and then lifted away will be referred to as a "flick". In other words, a flick is an operation in which a finger is swiftly flicked across the touch panel 271. If a touch-move with a predetermined distance or higher and a predetermined speed or higher is detected, and then a touch-up is detected, it can be determined that a flick has been performed (it can be determined that a flick was performed in succession to a drag). Furthermore, a touch operation in which the touch panel is touched at multiple locations (for example, two points) at the same time, and then the touch positions are moved closer to each other will be referred to as a "pinch-in", and a touch operation in which the touch positions are moved away from each other will be referred to as a "pinch-out". Pinch-out and pinch-in operations will be collectively referred to as "pinch operations" (or simply "pinching"). The touch panel 271 may employ a method that relies upon any of the following: resistive film, electrostatic capacitance, surface acoustic waves, infrared radiation, electromagnetic induction, image recognition and optical sensing. There are methods in which a touch is detected based on contact with the touch panel, as well as methods in which a touch is detected based on approach of a finger or a pen to the touch panel, and any method may be employed.

An eye proximity detection unit 217 detects whether an eye (an object) has approached (eye proximity) or has moved away from (eye separation) the eyepiece part 216 (approach detection). The system control unit 201 switches the backside display unit 101 and the EVF 229 between displaying (a display state)/not displaying (a non-display state) in accordance with the state detected by the eye proximity detection unit 217. The system control unit 201 sets a display destination as the backside display unit 101 and sets the EVF 229 to be not displaying during non-eye proximity detection at least in a case where the shooting mode and the switching of the display destination are automatic. Further, the system control unit 201 sets the display destination as the EVF 229 and sets the backside display unit 101 to be not displaying during eye proximity detection.

If an object has approached, infrared light irradiated from a light emitting unit (not illustrated) of the eye proximity detection unit 217 is reflected and incident on a light receiving unit (not illustrated) of the infrared proximity sensor. In accordance with an incident light amount of the infrared light received by the infrared proximity sensor, it is possible to detect an approach of some kind of physical object to the eyepiece part 216, and discriminate to what level of distance the object has gotten close to the eyepiece part 216 (an eye proximity distance). Upon detecting an approach of an object to the eyepiece part 216, the system control unit 201 can cause display of the EVF 229 to start. With this, it is possible for the EVF 229 to display without delay as much as possible when a user looks through the eyepiece part 216.

In addition, upon detecting that an object has approached within a predetermined distance with respect to the eyepiece part 216 from eye non-proximate state (no approach state), the eye proximity detection unit 217 determines that an eye proximity is detected and transmits an eye proximity detection notification to the system control unit 201. In addition, if an object for which an approach was detected is apart by the predetermined distance or more from an eye proximity state (approach state), the eye proximity detection unit 217 determines that eye separation is detected, and an eye separation detection notification is transmitted to the system control unit 201. A threshold for detecting eye proximity and a threshold for detecting eye separation may be made different such as by providing hysteresis for example. In addition, it is assumed that, after eye proximity is detected, there is an eye proximity state until eye separation is detected. In addition, it is assumed that, after eye separation is detected, there is an eye non-proximity state until eye proximity is detected. With this, the system control unit 201 performs display control of the backside display unit 101 and the EVF 229 in response to an eye proximity state or an eye separation state detected by the eye proximity detection unit 217. Details of the display control will be described later.

Note that the eye proximity detection unit 217 is not limited to an infrared proximity sensor, and another sensor may be used if it can detect an approach of an object or an eye to be deemed as an eye proximity.

The sight-line detection unit 260 includes a dichroic mirror 262, an image forming lens 263, a sight line detection sensor 264, a sight line detection circuit 265, and an infrared light-emission element 266 which follow, and detects whether or not there is a sight line of a user and also detects movement or a position of the sight line.

The infrared light-emission element 266 is a diode for emitting an infrared light for detecting a sight-line position of a user in a viewfinder screen, and irradiates the infrared light onto an eye 261 of a user. The infrared light irradiated from the infrared light-emission element 266 is reflected by the eye 261, and the reflected infrared light reaches the dichroic mirror 262. The dichroic mirror 262 has a function for reflecting on infrared light and allowing visible light to pass, and the reflected infrared light whose light path has been changed forms an image on an image capturing plane of the sight line detection sensor 264 via the image forming lens 263.

The image forming lens 263 is an optical member that configures a sight line detection optical system. The sight line detection sensor 264 includes an image sensor that uses a CCD, CMOS, or the like. The sight line detection sensor 264 photoelectrically converts incident reflected infrared light into an electric signal, and outputs the electric signal to the sight line detection circuit 265. Based on the output signal from the sight line detection sensor 264, the sight line detection circuit 265 detects a sight-line position of a user from a position of a pupil or movement of the eye 261 of the user, and outputs detected information to the system control unit 201. The sight line detection sensor 264 can detect a pupil of an eye of a person, and thus, even if another object approaches or touches the eyepiece part 216, the sight line detection sensor 264 does not detect that a sight line of a person has been inputted. By this, the eyepiece part 216 has a function as a sight line operation unit, but the sight-line detection unit may be another configuration.

With a sight line input setting unit 267, a user can set enabled or disabled for sight line detection in accordance with the sight line detection circuit 265, or set enabled or disabled of processing in response to a sight line operation by the system control unit 201. These settings are items that a user can set on a menu screen, for example. The system control unit 201 is capable of detecting the following states and operations with respect to the eyepiece part 216.

That input is not made to the eyepiece part 216/that a sight line is newly inputted to the eyepiece part 216 (start of sight line input).

Being in state where sight line is being inputted to the eyepiece part 216

Being in state where the eyepiece part 216 is being gazed at

That sight line which was being inputted to the eyepiece part 216 has been removed (end of sight line input).

Being in state where no sight line is being inputted to the eyepiece part 216.

These operations/states and an input position of a sight line for the eyepiece part 216 are notified to the system control unit 201, and the system control unit 201 can determine what kind of operation (sight line operation) has been performed for the eyepiece part 216 based on the notified information.

A gaze determination unit 290 determines that a predetermined region is being gazed at if, based on a sight line detection result received from the sight line detection circuit 265, the time that a user's sight line is fixed to the predetermined region continues for a predetermined time period. The predetermined time period can be changed by a gaze determination time period control unit 291 included in the system control unit 201. In addition, the system control unit 201 includes an object movement detection unit 292, and can add together movement information of a subject (object) and movement information of a camera to thereby detect movement (a direction in which the movement is made and a time period for the movement) of the object in an image being displayed on the EVF 229. The movement information of the camera can be obtained by a gyro sensor or an acceleration sensor included in the attitude detection unit 255. In accordance with the detection result by the sight line detection circuit 265 and the movement information of the object movement detection unit 292, the system control unit 201 determines whether or not movement of the user's sight line and movement of the object satisfy a predetermined condition. Note that the predetermined condition is for determining whether movement of the user's sight line and movement of the object substantially match (are similar).

<Sight line input processing> Next, with reference to FIG. 3, FIGS. 4A to 4C, and FIGS. 5A to 5C, description is given regarding processing in accordance with a sight line operation with respect to an object being displayed in the EVF 229, in the present embodiment.

FIG. 3 is a flowchart illustrating processing in accordance with a sight line operation with respect to an object being displayed in the EVF 229. The processing of FIG. 3 is realized by the power supply of the digital camera 100 being turned on, and the system control unit 201 loading a program stored in the nonvolatile memory 256 into the system memory 252, executing the program, and controlling each functional block. In addition, the processing of FIG. 3 is started when the sight line detection circuit 265 determines that there is a sight line input.

Figure 4A:
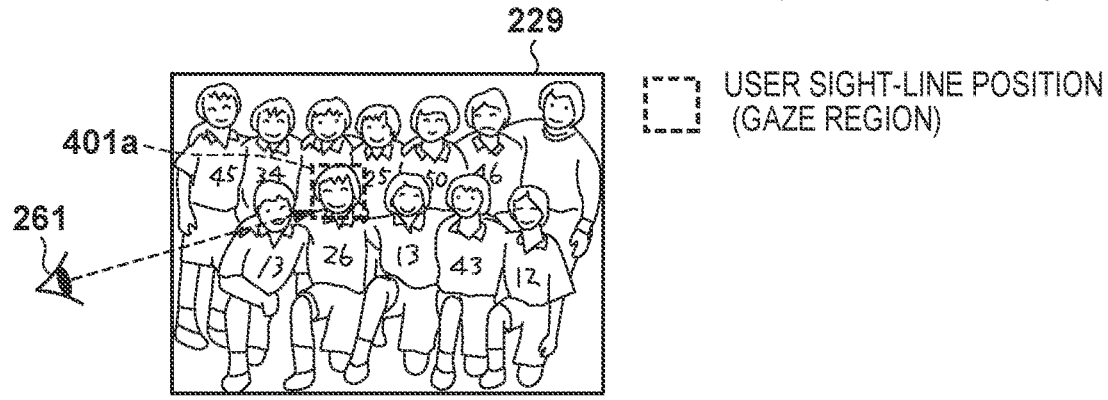
FIGS. 4A to 4C illustrate sight line operation determination processing of steps S301 and S302 of FIG. 3.
Figure 4B:
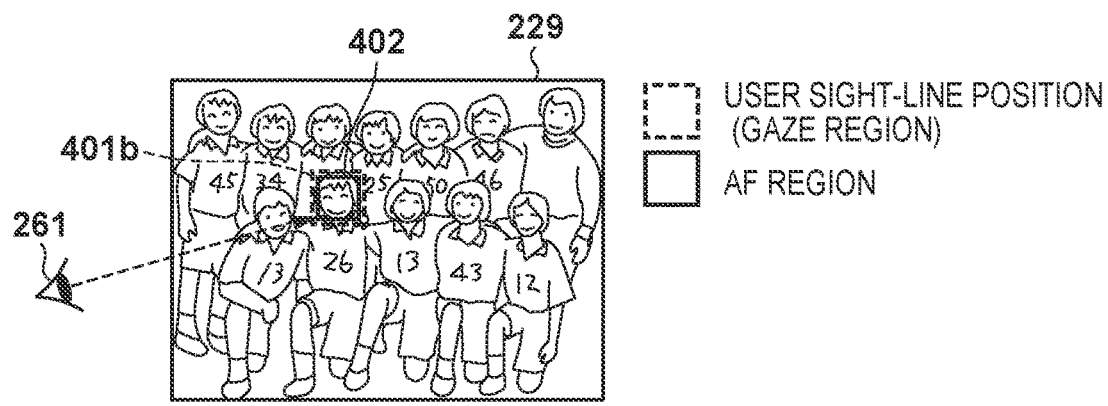
Figure 4C:
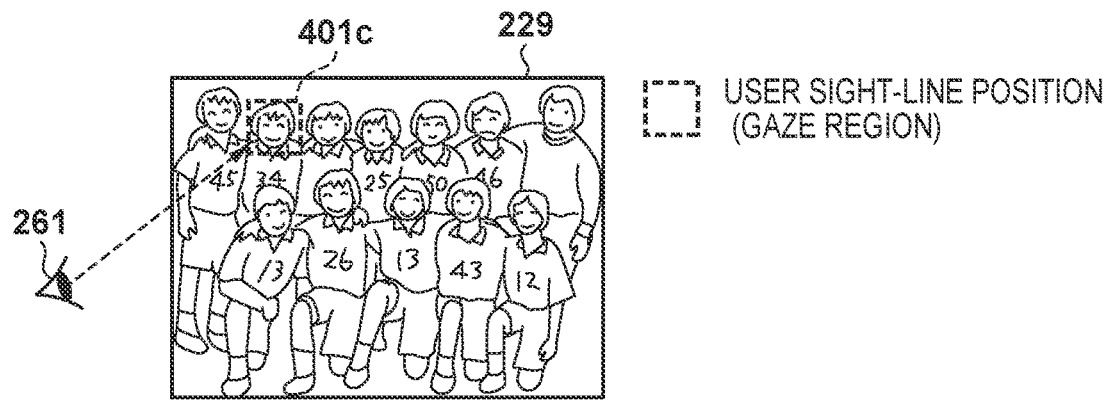

FIGS. 4A to 4C are views for describing examples of sight line operation determination and AF control (control for performing Auto Focus with respect to any subject in an angle of view) in step S301 and step S302 of FIG. 3. In addition, FIGS. 4A to 4C are display examples for a time where the operation mode of the digital camera 100 is the shooting mode and an object for which a sight line input is to be performed via the EVF 229 is a stationary object (something with little movement), and indicate user sight-line positions 401a, 401b, and 401c by dashed-line frames.

FIG. 4A illustrates that the sight line of a user accords with the face of a person. However, this is a state before a first time period TH1 has elapsed.

FIG. 4B is a state for a case where the user's sight line has been fixed on (has been gazing at) the face of the person for the first time period TH1 after the state of FIG. 4A, and indicates, by a solid line frame 402, that AF control is being performed with respect to a gaze region. In other words, control is performed so that focusing is performed with respect to subject in the solid line frame 402.

FIG. 4C is a state for a case where the user's sight line has moved to another person before the first time period TH1 elapses from the state of FIG. 4A, and indicates that AF control is not being performed to either (the subject at) the position that the user was gazing at in the state of FIG. 4A or (the subject at) the position at which the user is currently gazing at.

FIGS. 5A to 5C are views for describing an example of the sight line operation determination and the AF control in step S303 and step S304 of FIG. 3. In addition, FIGS. 5A to 5C are display example for a time where the operation mode of the digital camera 100 is the shooting mode and an object for which a sight line input is to be performed via the EVF 229 is a moving object. Sight-line positions 501a, 501b, and 501c of the user are indicated by dashed-line frames, and object positions 502a, 502b, and 502c are indicated by dashed-two dotted line frames.

FIG. 5A indicates that a user's sight-line position and the position of an object match. However, this is a state before the first time period TH1 has elapsed.

FIG. 5B is a state for a case where movement of the user's sight line and movement of the object have matched for a second time period TH2 from the state of FIG. 5A, and that AF control is being performed with respect to the object is indicated by a solid line frame 503. In addition, the movement of the user's sight line from FIG. 5A is indicated by a solid line 504b, movement of the object from FIG. 5A is indicated by an arrow symbol 505b, and it is indicated that the movement matched until the second time period TH2 elapsed.

FIG. 5C is a case where movement of the user's sight line and movement of the object did not match from the state of FIG. 5A, and indicates that AF control is not being performed. In addition, the movement of the user's sight line from FIG. 5A is indicated by a solid line 504c, movement of the object from FIG. 5A is indicated by an arrow symbol 505c, and it is indicated that the movement of these two did not match.

In step S301, the system control unit 201, by the gaze determination unit 290, measures a gaze time period with respect to a predetermined region, and if a first time period TH1 or more has elapsed the processing proceeds to S302, and if the sight line moves without the first time period TH1 elapsing the processing proceeds to step S303.

In step S302, the system control unit 201, by the gaze determination unit 290, determines that there is a sight line input (a sight line operation has been performed), and performs processing in accordance with the sight line operation with respect to a gaze region (an object). For example, if the digital camera 100 is in a shooting mode, processing in accordance with a one-shot AF mode is performed with respect to the gaze region, and if the digital camera 100 is in a menu mode, the gaze region is selected, and processing to move to a lower hierarchical level is performed. However, processing in accordance with a sight line operation is not limited to this, and other processing may be performed.

In step S303, the system control unit 201, by the object movement determination unit 292, measures a time period in which movement of the sight line and movement of an object match. If the second time period TH2 which is shorter than the first time period TH1 elapses the processing proceeds to step S304, and if an object matching movement of the sight line is not detected over the second time period TH2 the processing returns to step S301. For example, if the digital camera 100 is in the shooting mode, setting is such that TH1=100 ms>TH2=20 ms. The first time period TH1 corresponds to a time period until an AF operation in accordance with a sight line input is performed if the object is at rest. For the second time period TH2, a case where an object is a moving body and the object does not stop at predetermined region for time greater than or equal to the first time period TH1 is envisioned. However, the values of TH1 and TH2 are not limited to this, and may be other values.

Note that the sight line operation determination in step S303 is performed as follows:

Detect direction of movement α of user's sight line input→detect directions of movement $β1, β2, \ldots βn$ of objects→determines whether α is similar to one of β1 to βn→(1) determines whether a time period that α and β are similar exceeds a predetermined period of time. Note that the directions of movement $β1, β2, \ldots$ of the objects indicate the directions of movement of respectively different objects. In addition, (2) it is determined whether the moving object determined to be similar and the region for which there is a sight line input are within a predetermined distance, in other words whether the object displayed on the EVF 229 and the position on the EVF 229 of the detected sight line are within the predetermined distance. (3) It is determined whether the detected sight line is near the moving object. In other words, if there are a plurality of objects, an object whose direction of movement is similar to the direction of movement α of the sight line input is selected.

Configuration may be taken to determine YES in step S303, if there is YES for any of (1) to (3) or a combination of these, or if a β similar to α is detected.

Selection of the object is performed in the following way:

If there are a plurality of objects whose movement (a vector) is similar to α, the object closest to the sight-line position is selected.

In step S303, if movement (vector) of a plurality of objects match, the object whose direction and time of movement are most similar is selected.

In step S303, if a region surrounding the movement (vector) of the object is being looked at for the predetermined period of time or more, YES is determined even if the vector does not match. For example, in a case where a dog or the like moves back and forth, if a region in which the dog moves back and forth is being looked at for a long time period, the object is selected.

In step S303, something for which a time that α and β are similar is less than or equal to a predetermined time period (for example, less than or equal to 1 second) is set as a target of the determination.

In the example of FIG. 5B, a case where the region of the object 502b is larger than the gaze region 501b for which a sight line input can be made is envisioned, and, in a case where the gaze region 501b is included in the object 502b while the second time period TH2 elapses, it is determined that a sight line input has been made when movement of the two match. However, there is no limitation on a size relationship between the sizes of the gaze region and the object, and a determination method is not limited to the method described above, and may be another method.

In step S304, the system control unit 201 determines that a sight line input has been made with respect to the object, and performs processing suitable for the selected object in accordance with the sight line operation. For example, if the digital camera 100 is in the shooting mode, processing in accordance with a tracking AF mode is performed with respect to the selected object. However, processing in accordance with a sight line operation is not limited to this, and other processing may be performed.

By virtue of the present embodiment as described above, if movement of a sight line matches movement of an object, by a sight line input being performed with respect to the object, it becomes easier to perform a sight line operation at a timing intended by a user, even with respect to a moving body, and it is possible to reduce risk of performing an erroneous operation. Furthermore, it is also possible to solve problems of subject selection in AF control (selection of a subject in a case where there are a plurality of subjects having differing distances in a depth direction, and selection of a subject having fast movement on a display screen).

Note that it is also possible to select a subject in accordance with a touch operation with respect to the touch panel 271. In response to a touch operation with respect to the touch panel 271, a touched subject is selected. In a case where a tracking AF mode is set, the touched subject is tracked, and in a case where a one-shot AF mode is set, focus is fixed to the touched subject.

According to the present embodiment, it is possible to perform appropriate sight line input with respect to a moving body.

Note that the foregoing various control described as something that the system control unit 201 performs may be performed by one piece of hardware, and a plurality of pieces of hardware may distribute processing to perform control of the entirety of the apparatus.

In addition, although the present invention was explained in detail based on suitable embodiments, the present invention is not limited to these specific embodiments, and various forms of a scope that does not deviate from the gist of this invention are included in the invention. Furthermore, the above-described embodiment is merely one embodiment of the present invention, and different embodiments can be combined as appropriate.

The foregoing embodiment describes an example of a case where the present invention is applied in a digital camera. However, the present invention is not limited to this example. The present invention can be applied to an apparatus having a sight line input function. In other words, the present invention can be applied in personal computers and PDAs, mobile telephone terminals and portable image viewers, printers having displays, digital photo frames, music players, game devices, e-book readers, tablet terminals, smartphones, projection apparatuses, household apparatuses, vehicle-mounted apparatuses, and so on having displays.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-124753, filed on Jul. 3, 2019 which is hereby incorporated by reference herein in its entirety.

What is claimed is:

1. An electronic apparatus comprising:
a sight position detection unit configured to detect a region of a sight position to a display unit which displays an object; and
a control unit configured to perform control to, in a case where a state where the detected region of the sight position is not moving continues for a first time period, select an object corresponding to the region of the sight position, and
in a case where a state where the detected region of the sight position is moving and a direction of movement of the region of the sight position and a direction of movement of an object satisfy a predetermined condition continues for a second time period, select the object.

2. The apparatus according to claim 1, wherein the control unit performs control to perform predetermined processing in accordance with the selected object.

3. The apparatus according to claim 2, wherein the predetermined processing is focus processing or tracking processing with respect to the selected object.

4. The apparatus according to claim 1, wherein the control unit performs control to display, on the display unit, an item indicating the region of the sight position detected by the sight position detection unit.

5. The apparatus according to claim 1, wherein the control unit performs control to select, from a plurality of objects, an object whose direction of movement is closest to the direction of movement of the region of the sight position.

6. The apparatus according to claim 1, wherein, in a case where there is a plurality of objects for which a state where the direction of movement of the region of the sight position and directions of movement of the objects satisfy the predetermined condition continues for the second time period, control unit performs control to select an object close to a position of the sight position.

7. The apparatus according to claim 1, wherein the second time period is shorter than the first time period.

8. The apparatus according to claim 1, wherein a region of the object is larger than the region of the sight position.

9. The apparatus according to claim 1, further comprising:
an image capturing unit; and
an AF control unit configured to perform AF control to automatically focus on a predetermined region of a captured image,
wherein the AF control unit performs the AF control with respect to the selected object.

10. The apparatus according to claim 9, wherein
the AF control includes one-shot AF for fixing focus to the object, and tracking AF that continues to align focus on the object,
the AF control unit performs the one-shot AF with respect to the selected object in a state where the region of the sight position is not moving, and
performs the tracking AF with respect to the selected object in a state where the region of the sight position is moving.

11. A method of controlling an electronic apparatus comprising:
detecting a region of a sight position to a display unit which displays an object; and
performing control to, in a case where a state where the detected region of the sight position is not moving continues for a first time period, select an object corresponding to the region of the sight position, and
in a case where a state where the detected region of the sight position is moving and a direction of movement of the region of the sight position and a direction of movement of an object satisfy a predetermined condition continues for a second time period, select the object.

12. A non-transitory computer-readable storage medium storing a program for causing a computer to execute a method of controlling an electronic apparatus comprising:
detecting a region of a sight position to a display unit which displays an object; and
performing control to, in a case where a state where the detected region of the sight position is not moving continues for a first time period, select an object corresponding to the region of the sight position, and
in a case where a state where the detected region of the sight position is moving and a direction of movement of the region of the sight position and a direction of movement of an object satisfy a predetermined condition continues for a second time period, select the object.

* * * * *